United States Patent [19]
Wright

[11] Patent Number: 4,689,796
[45] Date of Patent: Aug. 25, 1987

[54] METHOD AND APPARATUS FOR REGULATING PRESSURE IN LASER TUBES

[75] Inventor: David L. Wright, Rough and Ready, Calif.

[73] Assignee: Spectra-Physics, Inc., San Jose, Calif.

[21] Appl. No.: 779,539

[22] Filed: Sep. 24, 1985

[51] Int. Cl.⁴ ............................................... H01S 3/00
[52] U.S. Cl. ........................................ 372/33; 372/59; 372/83; 372/34; 372/23
[58] Field of Search ....................... 372/59, 83, 34, 61, 372/55, 23

[56] References Cited

U.S. PATENT DOCUMENTS

| | | | |
|---|---|---|---|
| 3,566,304 | 2/1971 | Neusel et al. | 372/59 |
| 3,876,957 | 4/1975 | Thatcher | 372/59 |
| 4,224,579 | 9/1980 | Marlett et al. | 372/59 |
| 4,232,274 | 11/1980 | Tokudome et al. | 372/59 |
| 4,547,885 | 10/1985 | Allen et al. | 372/59 |
| 4,617,668 | 10/1986 | Rudko et al. | 372/83 |

FOREIGN PATENT DOCUMENTS

| 2028571 | 3/1980 | United Kingdom | 372/59 |
|---|---|---|---|

Primary Examiner—Leon Scott, Jr.
Attorney, Agent, or Firm—Donald C. Feix; Paul Davis; T. M. Freiburger

[57] ABSTRACT

A temperature responsive, gas entrapping material contained in a chamber connected to a gas laser tube selectively entraps gas to regulate the pressure in the laser tube. A temperature regulator adjusts the temperature of the gas entrapping material and thereby controls the pressure of the gas in the laser tube. The temperature of the gas entrapping material can be adjusted by cooling or by heating. The pressure in the laser tube is monitored. The tube voltage can be used to monitor the pressure. Temperature adjustment of the gas entrapping material permits development of optimum gas pressure in the laser tube for different wave lengths. In one embodiment the laser is a krypton gas laser and the gas entrapping material is activated charcoal or aluminosilicate. The gas entrapping material may be heated, during assembly of the gas laser, to a temperature high enough to remove foreign material which might otherwise interfere with the operation of the laser tube.

22 Claims, 5 Drawing Figures

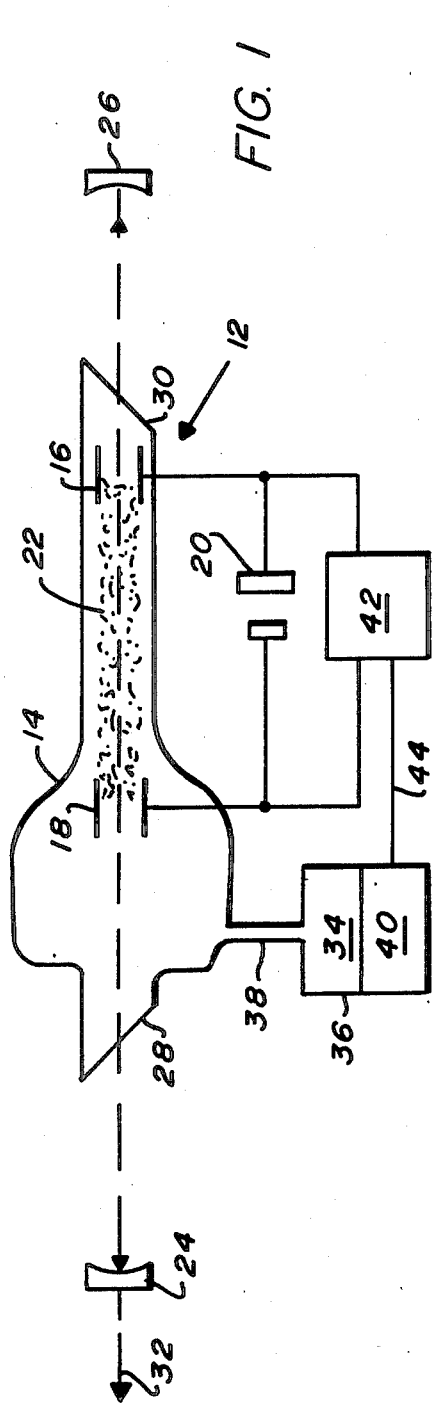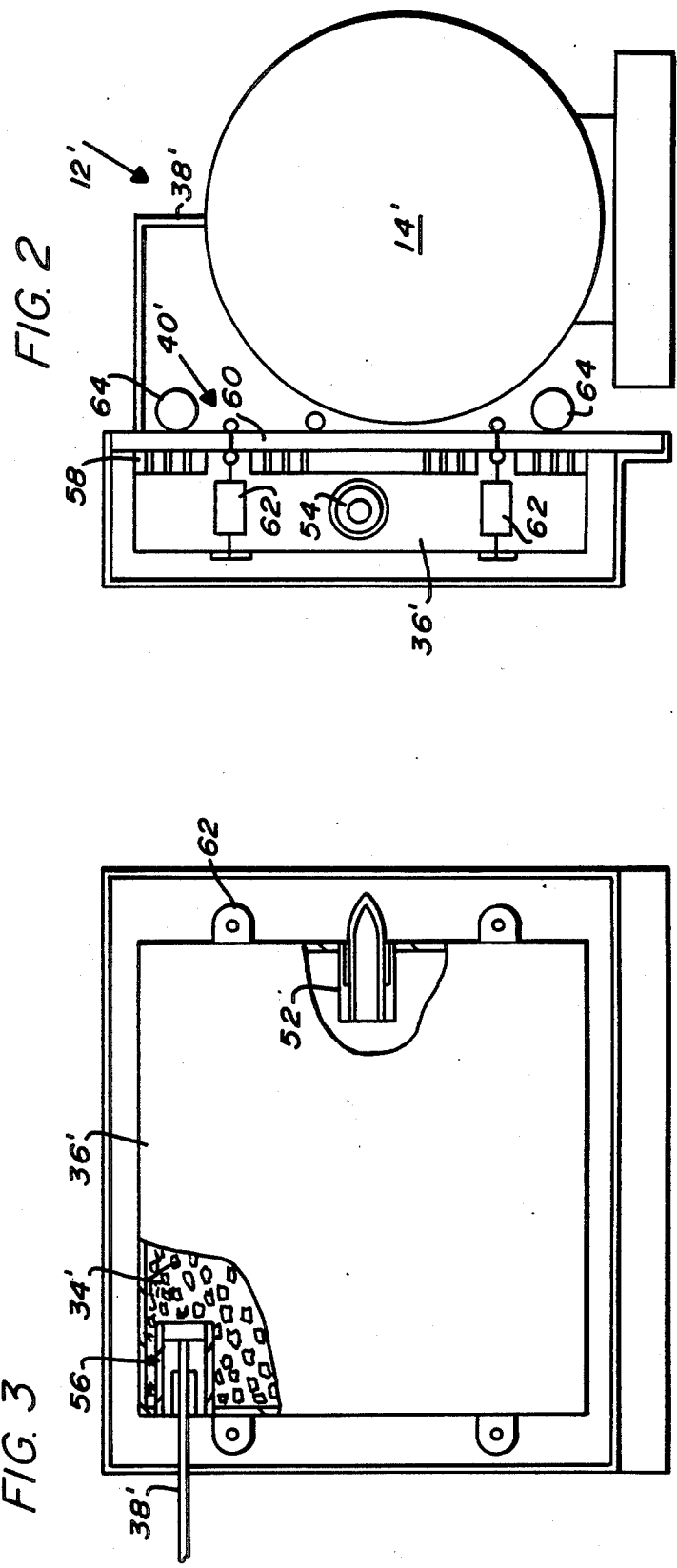

METHOD AND APPARATUS FOR REGULATING PRESSURE IN LASER TUBES

BACKGROUND OF THE INVENTION

The present invention relates to methods and apparatus for regulating pressure in a laser tube of a gas laser and to methods for constructing the pressure regulating components of a gas laser. The present invention relates particularly to a gas laser of the kind having a laser tube filled with low pressure gas and subject to pressure variations which tend to interfere with or to prevent lasing operation. The method and apparatus of the invention overcome or minimize such undesirable pressure variations.

In gas laser tubes of the kind used in the present invention, lasing occurs with a selected gas, such as, for example, argon, krypton or xenon. These gas lasers operate at low tube pressures of a few torr, and the pressure in the tube is important for proper operation.

Most gas lasers, however, are subject to unpredictable tube pressure variations for a number of reasons. U.S. Pat. No. 4,477,908 issued Oct. 16, 1984 and assigned to the same assignee as the assignee of this application discusses some of the reasons for such pressure fluctuations. The gas within the laser tube may be lost due to ions of the gas being buried in the gas tube cathode. Ions may be entrapped by sputtering effects within the tube. The gas ions may subsequently be released to again form free gas within the laser tube. These factors can cause undesirable pressure variations.

A gas laser tube has an anode and a cathode. The anode and cathode are spaced apart and develop a voltage which is related to the pressure of the gas within the tube. That voltage level is also important in connection with the operating characteristics of the laser.

Pressure variations and related variations of voltage may interfere with the proper operation of the laser and may also cause substantial problems in connection with the power supply producing the voltage within the tube. If substantial pressure and voltage variations occur within the tube, it may be necessary for the power supply to be oversized with respect to the tube in order to assure proper control of the voltage and current characteristics with the tube. Close regulation of the pressure and voltage within the tube permits the use of smaller, more efficient and more economical power supplies.

Pressure variation and instability within gas lasers become even more severe in lasers using heavy gases such as krypton. Krypton lasers are desirable in a number of applications because of their ability to function effectively at ultraviolet, visible and infrared wave lengths.

Window problems become more severe in lasers covering a wide range of wavelengths. Crystalline quartz is a good window material because it has a wide transmission range and minimizes solarization or darkening after prolonged exposure to radiation. Crystalline quartz windows, however, do have a relatively high affinity for dirt and other foreign material which may be present within the gas tube.

Mechanical components, including storage tanks, valves and pumps, have been employed for regulating the pressure in systems designed and intended to avoid spontaneous pressure variations. These mechanical components have seals formed from plastic or other organic material. Even if the seals are formed from polyfluorotetraethylene materials (available, for example, under the TEFLON trademark of the du Pont Company) organic particles or gases tend to be introduced into the system and to find their way into the gas tube. The organic particles and gases are attracted to crystalline quartz and form monomolecular layers on the surfaces of the windows. These monomolecular layers of dirt and other organic foreign material increasingly interfere with operation of the laser apparatus, particularly over extended periods of time.

Avoiding or minimizing pressure variations within the gas tubes has been a problem in the prior art.

Avoiding the deposition of dirt and organic films on windows, particularly upon crystalline quartz windows, has been another problem in the prior art.

In arriving at the present invention, other techniques were tested as a means for avoiding these problems. A gas ballast reservoir was connected to the tube with the objective that relatively limited pressure fluctuations within the tube would be minimized by the large volume of gas in the ballast. The use of a ballast appeared desirable because it avoided the use of mechanical pumps and eliminated seals which would tend to introduce foreign material. The use of a ballast, however, did not satisfactorily overcome all the problems.

The presence of the molecular sieve materials used for pressure control not only avoids the introduction of organic materials to control pressure, but provides a means of absorbing organics introduced inadvertently during the manufacturing process.

SUMMARY OF THE INVENTION

It is a primary object of the invention to regulate the pressure within gas lasers in a way which is effective to avoid the problems of the prior art.

It is a further object of the invention to regulate the pressure within the tube by a temperature responsive, gas entrapping material having the ability to absorb or to adsorb certain materials including gas from the laser tube.

The gas entrapping material is contained in a chamber connected to the laser tube. A heater or a cooler adjusts the temperature of the material to regulate its trapping characteristics and to selectively regulate the gas pressure in the laser tube.

The present invention avoids the need for mechanical components including seals which can introduce undesirable foreign material into the laser tube.

The present invention utilizes the characteristics of gas trapping materials such as charcoal, activated charcoal, silica gel, finely divided oxides such as aluminosilicate and the like having absorption or adsorption characteristics which are temperature dependent. Some embodiments of the present invention employ gas trapping materials in the form of "molecular sieves" having characteristics, such as pore size, which are particularly adapted for absorbing or adsorbing selected gases.

Molecular sieve materials can be heated to relatively high temperatures to get rid of undesirable gases entrapped within the molecular sieve material.

In the present invention a quantity of gas trapping materials, including molecular sieve materials, are selected to maximize the gas trapping characteristics of the material to the specific gas used in the laser. The gas entrapping materials are placed in communication with a gas laser tube and are then subjected to temperature control. The amount of entrapped gas effectively varies the amount of gas remaining in the tube. The method and apparatus of the present invention thus uses the temperature control of the gas entrapping material to regulate the pressure in the gas laser tube.

It is a related object of the invention to determine instantaneous pressure within the tube, either by direct measurement of the pressure or by monitoring the voltage across the tube. The voltage is generally proportional to the pressure of the tube gas. The pressure may be measured directly by conventional means such as thermocouples gauges, Pirani gauges, capacitance manometers, etc.

It is a further object of the invention to employ gas entrapping material which is also capable of attracting and entrapping foreign material which might otherwise tend to be deposited upon windows of the gas laser tube. As noted above, this object of the invention is particularly important in connection with gas laser tubes employing windows formed from crystalline quartz.

It is yet another object of the invention to employ the gas entrapping material referred to above in connection with a gas laser assembly of the type including a power supply operatively coupled with the anode and the cathode of the gas tube for selectively establishing electrical voltage and current conditions within the tube. Operation of the power supply is thus further facilitated and enhanced by the ability to minimize or eliminate pressure variations in the gas tube and accordingly to minimize or to eliminate voltage variations which might otherwise place excessive requirements upon the power supply.

It is yet another related object of the invention to employ the combination summarized above in connection with gas lasers capable of operation at different optical wave lengths within the gas tube. Temperature adjustment of the gas entrapping material adjusts the pressure within the gas tube to a level most suitable for the particular optical wave length.

It is yet another object of the invention to manufacture a gas laser in a way which minimizes the presence of foreign material in the laser. In this method of manufacture the gas entrapping material is heated to a temperature high enough to drive off foreign material which might otherwise interfere with operation of the laser tube. The gas entrapping material is then connected to the gas laser tube for temperature adjustment (as described above) to regulate the pressure within the tube and absorb contaminents.

It is a related object to monitor the pressure within the tube and to adjust the temperature of the gas entrapping material in accordance with monitored pressure.

Other and further objects of the present invention will be apparent from the following description and claims and are illustrated in the accompanying drawings which, by way of illustration, show preferred embodiments of the present invention and the principles thereof in what are now considered to be the best modes contemplated for applying those principles. Other embodiments of the invention, embodying the same or equivalent principles, may be used and structural changes may be made as desired by those skilled in the art without departing from the present invention and the purview of the appended claims.

BRIEF DESCRIPTION OF THE DRAWINGS

FIG. 1 is a schematic view showing how the pressure regulating apparatus of the present invention is operatively associated with a gas laser.

FIG. 2 is an end view in elevation showing one embodiment of the pressure regulating apparatus associated with the gas laser tube.

FIG. 3 is a view taken from the left side of FIG. 2 but with some parts broken away to illustrate the construction.

DESCRIPTION OF THE PREFERRED EMBODIMENTS

Figure 5:
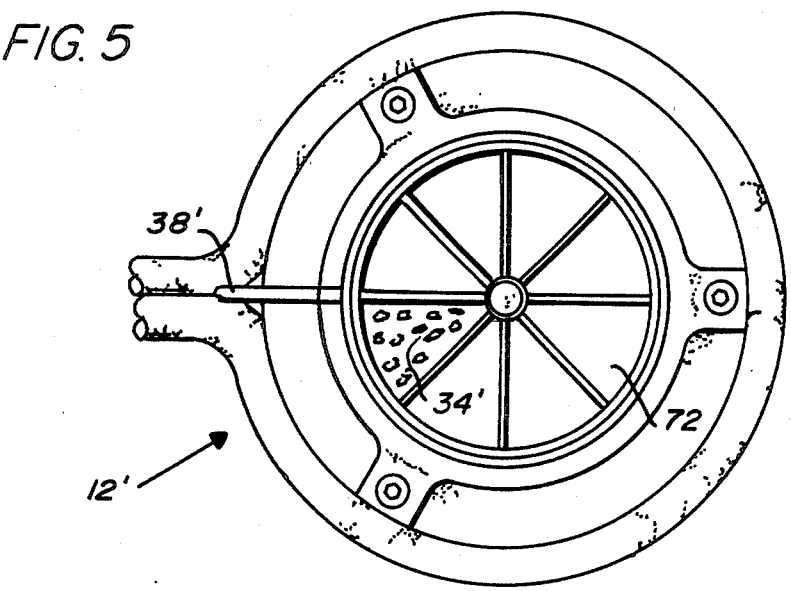
FIG. 5 is a plan view of the apparatus shown in FIG. 4.

In FIG. 1 a gas laser constructed in accordance with the present invention is generally indicated at 12.

The gas laser 12 includes a coaxial laser tube 14 containing a gas at low pressure. As will be described in greater detail below, the laser tube 14 and other components of the gas laser 12 are adapted for use with various gases, including gases having a relatively high molecular weight, such as krypton gas.

The tube 14 includes an anode 16 and cathode 18. The anode and cathode are spaced apart along the axis of the tube. An electrical voltage is applied by a power source 20 interconnected between the anode 16 and cathode 18. Because of the voltage developed between the anode and cathode, the gas within the tube 14 tends to be ionized in the region 22.

Mirrors 24 and 26 are arranged at opposite ends of the tube 14 and are placed in optical communication with the tube interior by means of conventional windows 28 and 30 at the respective ends of the tube 14. The mirrors 24 and 26 form a resonant cavity for development of a lasing function within the tube 14. The mirror 24 is a partially transmitting mirror and permits a laser beam to be projected from the tube 14 as indicated by the arrow 32.

Prior art laser tubes have commonly been connected with mechanical components (mechanical pumps, storage tanks and valves) to develop low pressure conditions on the order of a few torr, for example, from 0.1 to 5 torr and preferably 0.2 to 1.5 torr within the laser tube.

As noted above, these prior art mechanical components presented problems. The seals and other components were formed from organic material and tended to introduce at least small amounts of foreign material into the laser tube. The foreign material presented a particular problem when the windows in the tube were formed from crystalline quartz, because of the strong affinity of crystalline quartz for foreign material and the tendency of the foreign material to interfere with the necessary optical performance of the crystalline quartz windows.

The ways in which low pressure conditions are developed and maintained within the laser tube 14 in accordance with the present invention and to avoid the problems of the prior art are described immediately below.

In order to regulate the amount and presure of gas within the tube 14, the interior of the tube 14 is placed in communication with temperature responsive gas entrapping material. The material is indicated generally at 34 and is selected for its ability to retain materials, including gas of the type employed within the tube 14. The gas entrapping material 34 is arranged within a chamber 36 in communication with the interior of the tube 14 by an interconnecting conduit 38. Gas from the interior of the tube 14 is free to circulate from the tube into intimate contact with the gas entrapping material 34 within the chamber 36.

The present invention takes advantage of the known fact that gas entrapping materials can be selected with a chemical composition and physical characteristics, including surface area, pore size and the like, to develop a particular affinity for selected materials, including gases. The present invention also takes advantage of the known fact that a definite relationship exists between the amount of a selected gas entrapped per unit mass or per unit area of the gas entrapping material 34 and certain selected variables, including pressure and temperature. In the present invention the chemical composition and physical characteristics of the gas entrapping material 34 are selected to have a particular affinity for the gas in the tube 14. In one specific case the gas is krypton.

It is an important feature of the present invention that temperature adjusting means 40 are placed in thermally conductive relation with the gas entrapping material 34 but not within the gas volume of chamber 36. The temperature adjusting means 40 are operable for selectively adjusting the temperature of the gas entrapping material 34. This regulates the gas entrapping characteristics of the material 34 and provides effective control of the presence of the gas in the tube 14.

In the prior art, gas entrapping materials have been maintained at very low temperatures of about −200°C. by the use of liquid nitrogen to maximize their effectiveness. In contrast, the temperature adjusting means 40 of the present invention regulate the temperature of the gas entrapping material 34 within a range extending from just below 0° C. to near room temperature.

As will be described in greater detail below, the temperature adjusting means 40 may alternately perform a cooling and/or a heating function in order to selectively adjust the temperature of the material 34 and achieve optimum pressure characteristics within the tube 14 in accordance with the invention.

The temperature responsive gas entrapping material 34 may be selected from a variety of compositions including but not limited to, charcoal, activated charcoal, chemical absorbents or "chemisorbents", silica gel and finely divided oxides, such as alumino-silicate and the like. All of these materials have entrapping capabilities in the form of adsorption or absorption characteristics which are temperature dependent. A particularly effective gas entrapping material is an alumino-silicate composition commonly referred to as "molecular sieve" material and available as types 4A, 5A and 13X from the Linde Division of the Union Carbide Corporation.

It was further noted above that relatively spontaneous pressure variations tend to develop or occur within the interior of gas laser tubes such as that indicated at 14. These pressure variations could be relatively minor, for example, in the range of approximately 1 to 10 percent of normal tube pressure without interfering with normal lasing activity within the tube 14. However, such pressure fluctuations could also occur within seconds, for example, and may represent as much as a 30 to 50 percent increase above normal pressure levels in the tube, thus tending to interfere with or completely terminate lasing activity within the gas laser tube 14.

One of the particular problems with gas laser apparatus because of these spontaneous pressure variations results from the fact that voltage between the anode and cathode 16 and 18 tends to vary generally in proportion with tube pressure. Thus, upon occurrence of a spontaneous pressure variation, the electrical load conditions for the power supply 20 may vary widely during operation of the laser. Accordingly, it has been common practice in the past to provide oversized power supplies in order to meet these widely varying conditions.

The present invention further takes advantage of the fact that voltage within the tube 14 is proportional to tube pressure. A voltage monitor 42 instantaneously determines voltage conditions within the tube 14 as an indication of gas pressure within the tube. At the same time, the temperature adjusting means 40 are responsive to the voltage monitor 42 as is generally indicated at 44. The temperature adjusting means 40 are caused to rapidly adjust temperature of the gas entrapping material 34 in order to minimize pressure variations occurring within the tube 14. As noted above, it is of course also possible to monitor tube pressure by other means.

Figure 4:
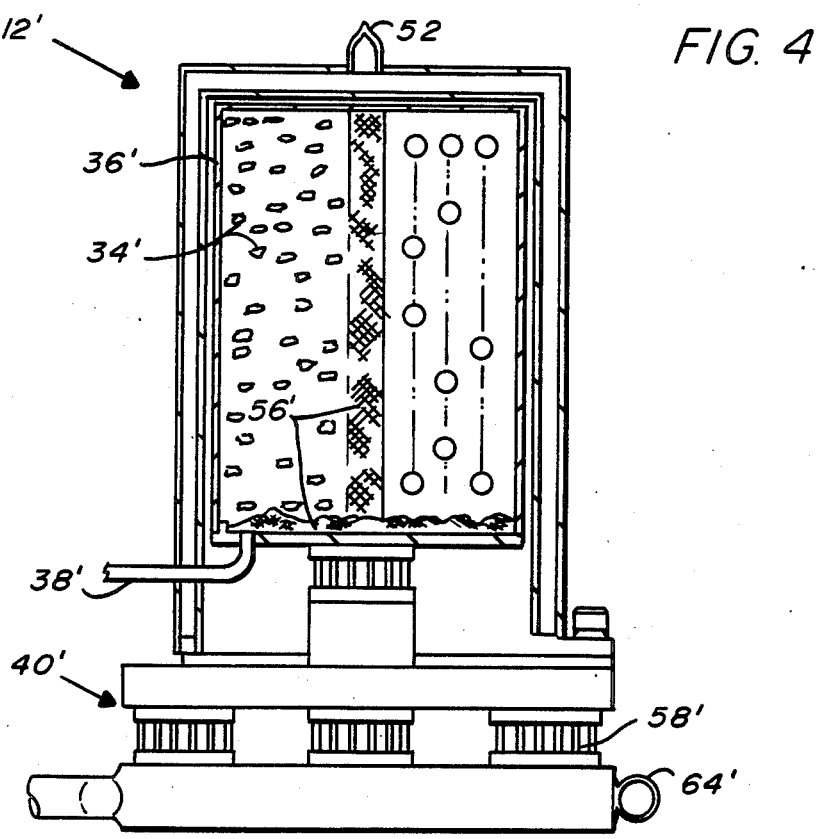
FIG. 4 is a centrally-sectioned side view in elevation of another embodiment of the pressure regulating apparatus used with a gas laser tube.

One embodiment of components for a gas laser assembly are illustrated in FIGS. 2 and 3, and another embodiment is shown in FIGS. 4 and 5. These embodiments are described below. However, before leaving the embodiment of FIG. 1, it should be noted that the present invention employs only the gas entrapping material 34 in communication with the interior of the tube 14 for adjusting gas pressure in the tube. All of the interior portions of the gas entrapping chamber 36 and the conduit means 38 (interconnecting the chamber and gas entrapping material 34 with the interior of the tube 14) are structural materials and are free of foreign materials, such as organics, which could release organic gases. Also in the present invention, the gas entrapping material 34 and the chamber 36 and conduit 38 are in no way damaged upon being heated to temperatures high enough to drive off foreign materials. The present invention particularly adapts itself for minimizing the presence of foreign materials in the laser tube 14.

The gas entrapping material 34 is also be selected to have suitable characteristics for attracting and entrapping foreign materials such as dirt, organic gases and the like which might otherwise interfere with optical performance of the windows 28 and 30.

The gas laser 12 may also be adapted for operation at different optical wave lengths within the laser tube 14. The gas laser, when operated at different wave lengths, has optimum characteristics at specific pressure levels within the tube 14 corresponding to the specific wave lengths. The present invention, in the use of the gas entrapping material 34 and temperature adjusting means 40, provides a novel combination for selectively adjusting the pressure within the tube 14 to be at an optimum level depending upon the instantaneous optical wave length within the tube.

Preferred constructions for the molecular sieve chamber 36 and the temperature adjusting means 40 are illustrated in the respective embodiments of FIGS. 2 and 3 and FIGS. 4 and 5. Components in the embodiments of FIGS. 2, 3 and FIGS. 4, 5 which are similar to components of FIG. 1 are indicated by similar but primed reference numerals.

Referring initially to FIGS. 2 and 3, the chamber 36' is fabricated from material such as stainless steel which can be heated to high temperatures suitable for eliminating undesirable foreign material from the gas entrapping material 34'. Foreign material can be removed, for example, through a pump vent 52 which is then plugged or closed as indicated at 54 for subsequent operation of the laser assembly 12'.

A particle filter 56 communicates the interior of the chamber 36' and the material 34' with the conduit 38' in order to permit circulation of gas from the tube 14' into the chamber 36'.

The temperature adjusting means 40', comprise thermoelectric cooling elements 58 mounted upon a copper plate or heat sink 60 secured to the chamber 36' by springs 62.

The thermoelectric cooling elements are individual bars brazed between conducting plates. The plate 6d and stainless steel chamber 36' are fully conductive. The bars are semiconducting.

Passing a current through the bars of the thermoelectric cooling elements transfers heat from one plate to another. The function is reversible. If the polarity is changed, the transfer of heat is changed to flow in the other direction. The thermoelectric cooler (or heater) works on the Peltier effect. The temperature change is in the range of 40° C. to 50° C. per stage of the thermoelectric cooler.

A water cooling coil 64 is also mounted on the heat sink plate 60 for removing heat developed by the thermoelectric elements.

Referring to FIGS. 4 and 5, another embodiment of a gas laser assembly 12' comprises a chamber 36' comprising segments 72 of molecular sieve material 34'. A filter 56' encloses the gas entrapping material 34' to serve a similar function as the filter 56 of FIGS. 2 and 3.

Otherwise, the embodiment of FIGS. 4 and 5 comprises other components similar to those described above for FIGS. 1-3 and indicated by similar primed numerals.

Referring to the embodiments of FIGS. 1-5, any of the temperature adjusting means 40 or 40' comprise cooling and/or heating means as indicated at 40' in FIGS. 2-5. When heating means are employed, the volume and surface area of the gas entrapping material are increased relative to the embodiments of FIGS. 2-5 in order to provide adequate entrapping characteristics at ambient conditions. The gas entrapping material is then heated to reduce its gas retention capacity and to increase the pressure in the laser tube.

While the preferred embodiments of the present invention have been illustrated and described above with a number of variations of the invention being represented by numerous examples, it is to be understood that these aspects of the invention are capable of further variation and modification, and it is therefore not wished that the invention be limited to the precise details set forth, but rather that the invention be contemplated with such additional changes and alterations as fall within the purview of the following claims.

I claim:

1. In a gas laser assembly of the type wherein a lasing gas is confined at low pressure within the interior of the laser tube for permitting gas from the laser tube to circulate between the laser tube and the chamber means,
    wall members defining a chamber means which is positioned in fluid communication with the interior of the laser tube for permitting gas from the laser tube to circulate between the laser tube and the chamber means,
    temperature sensitive gas entrapping material positioned in a gas volume area of the chamber means and selected for its ability to entrap materials including lasing gas from the laser tube,
    temperature adjusting means positioned adjacent to the gas volume area of the chamber means and arranged in thermally conductive relation with the gas entrapping material for adjusting the temperature of the material and thereby regulating entrapping characteristics of the material for the laser tube gas in order to selectively regulate pressure of the gas in the laser tube and
    voltage monitioring means operatively associated with the interior of the laser tube and the temperature adjusting means to determine voltage conditions and gas pressure within the interior of the tube.

2. The gas laser assembly of claim 1 wherein the chamber means comprises a hermetically sealed compartment separate from the tube and including conduit means providing hermetically sealed communication between the tube and compartment for allowing gas from the tube to circulate into communication with the gas entrapping material arranged in the compartment.

3. The gas laser assembly of claim 2 wherein the compartment is insulated from its surrounding environment and wherein the temperature adjusting means are arranged in thermally conductive relation with the gas entrapping material in the insulated compartment.

4. The gas laser assembly of claim 3 wherein the temperature adjusting means include a thermoelectric cooler.

5. The gas laser assembly of claim 3 wherein the temperature adjusting means comprise heating means for selectively heating the gas entrapping material.

6. The gas laser assembly of claim 1 wherein spontaneous pressure variations tend to occur in the tube and wherein pressure regulation is achieved in the tube by temperature adjustment of the gas entrapping material for minimizing the pressure variations in the tube.

7. The gas laser of claim 6 wherein the laser tube includes anode and cathode means having a voltage developed therebetween proportional to gas pressure in the tube and further comprising means for monitoring voltage in the tube and thereby determining the temperature adjustment necessary in the gas entrapping material for reducing gas pressure variations in the tube.

8. The gas laser assembly of claim 7 further comprising a power supply means operatively coupled with the anode and cathode and the voltage monitoring means.

9. The gas laser assembly of claim 1 wherein the gas in the tube comprises krypton.

10. The gas laser assembly of claim 1 wherein the tube comprises light transmitting window means subject to optical interference by deposition of foreign material on the window means, the gas entrapping material further being selected for its ability to entrap the foreign material.

11. The gas laser assembly of claim 10 wherein the window means is crystalline quartz.

12. The gas laser assembly of claim 1 wherein the gas entrapping material is selected from the class consisting of charcoal, activated charcoal, silica gel, finely divided oxides including alumina and alumino-silicate, and chemical absorbents.

13. The gas laser assembly of claim 1 wherein the gas entrapping material is alumino-silicate.

14. The gas laser assembly of claim 1 wherein the gas entrapping material and internally exposed portions of the chamber means are substantially free of organic materials tending to interfere with operation of the gas tube.

15. The gas laser assembly of claim 1 wherein the gas entrapping material and internally exposed portions of the chamber means are suitable for heating to high temperatures capable of driving off and removing foreign material tending to interfere with operation of the gas tube.

16. The gas laser assembly of claim 15 wherein the gas entrapping material and internally exposed portions of the chamber means are exposed to high temperatures suitable for driving off foreign material prior to being placed in operative communication with the gas tube.

17. The gas laser assembly of claim 1 being capable of operation at different optical wavelengths, the temperature adjusting means adjusting the temperature of the gas entrapping material for maintaining a pressure in the tube which is selected as being most suitable for the optical wavelength in the tube.

18. In a method of operating a gas laser assembly of the type wherein a gas is confined at low pressure within the interior of a laser tube for development of lasing activity therein, the steps comprising employing a temperature sensitive gas entrapping material in a chamber means in communication with the laser tube for permitting gas to circulate between the laser tube and the gas entrapping material in the chamber means, arranging temperature adjusting means in thermally conductive relation with the chamber means, and operating the temperature adjusting means to selectively adjust temperature of the gas entrapping material and thereby regulate entrapment of the gas by the gas entrapping material in order to selectively regulate pressure of the gas in the tube and thereby enhance operation of the laser assembly.

19. The method of claim 18 further comprising providing a voltage monitoring means to monitor pressure in the tube for determining temperature adjustment necessary in the gas entrapping material in order to reduce gas pressure variations in the tube.

20. The method of claim 18 wherein the gas entrapping material is selected from the class consisting of charcoal, activated charcoal, silica gel and finely divided oxides including alumina and alumino-silicate, and chemical absorbents.

21. The method of claim 18 wherein the tube comprises light transmitting window means subject to optical interference by deposition of foreign material, the gas entrapping material further being selected for its ability to entrap the foreign material and minimize its deposition on the window means.

22. The method of claim 18 wherein the gas laser assembly is of the type which can operate at different optical wavelengths within the gas tube and further comprising the step of providing a temperature adjusting means to selectively adjust temperature of the gas entrapping material for maintaining in the tube a pressure selected as being most suitable for the optical wavelength.

* * * * *